May 12, 1931.  M. S. LOWER  1,805,045

PIN AND CLIP TRAY

Filed May 10, 1928

INVENTOR.
MELVIN S. LOWER
BY Ely & Barrow
ATTORNEYS

Patented May 12, 1931

1,805,045

UNITED STATES PATENT OFFICE

MELVIN S. LOWER, OF BARBERTON, OHIO, ASSIGNOR TO THE SUN RUBBER COMPANY, OF BARBERTON, OHIO, A CORPORATION OF OHIO

PIN AND CLIP TRAY

Application filed May 10, 1928. Serial No. 276,631.

This invention relates to pin and clip trays for office use on desks or tables to hold pins, clips, paper fasteners, etc.

The general purpose of the invention is to provide a simple, inexpensive compartment tray of indestructible, one-piece, molded and vulcanized rubber which is light and resilient and will not mar the surface of a desk, and the base of which constitutes a vacuum cup whereby accidental displacement of the tray from the desk is prevented. The bottoms of the compartments are rounded to merge with the sides, corners which collect dirt being thus eliminated.

The foregoing and other purposes of the invention are attained by the tray shown in the accompanying drawings and described below. It is to be understood that the invention in not limited to the specific form thereof shown and described.

Of the accompanying drawings.

Figure 1:
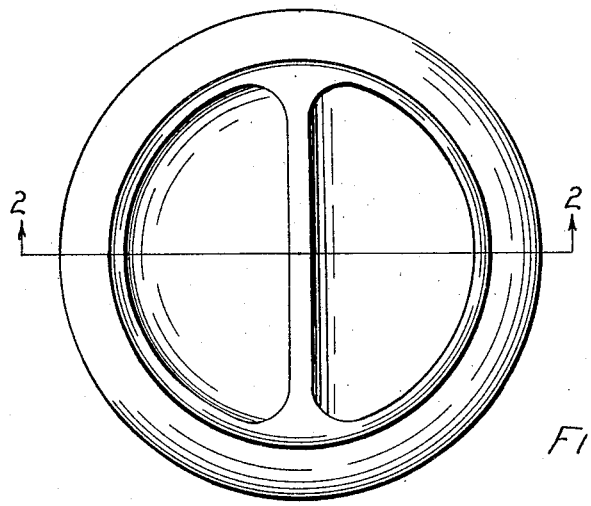
Figure 1 is a plan of a tray embodying the invention.
Figure 2:
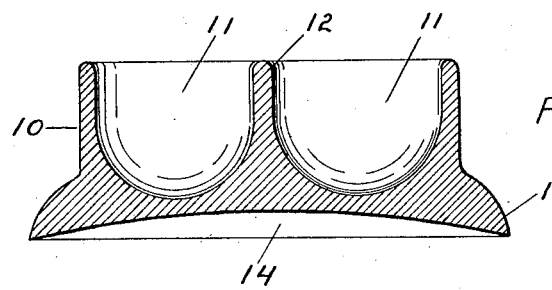
Figure 2 is a diametral section on line 2—2 of Figure 1.

Referring to the drawings, the numeral 10 designates a body of resilient, vulcanized rubber molded to provide a plurality of compartments 11, 11 divided by partitions such as partition 12, and an enlarged base 13, the bottom of which is concave or dished as at 14 to provide a suction cup serving to prevent displacement of the tray from the surface of a desk. The bottoms of the compartments are rounded as shown so as to merge with the walls thereof and eliminate corners.

The partition 12 and the rounded bottoms of the compartments tend to give the tray body considerable rigidity. If the suction bottom of the tray were the same diameter as the upper part, this rigidity would adversely affect the suction action. For this reason, it has been found advantageous to provide the enlarged base which is unaffected by the stiffness of the tray.

In placing the tray on the desk or table, it is pressed against the desk, the enlarged portion of the base yielding to provide a suction cup action. Due to the soft rubber construction, the surface of the desk or table is not marred by the tray.

Modifications of the invention may be resorted to without departing from the spirit thereof or the scope of the appended claim.

What is claimed is:—

A tray for use as a receptacle for pins, clips, paper fasteners and the like, said tray comprising a one-piece, molded and vulcanized body of soft, resilient rubber formed with a partition wall providing compartments having bottoms rounded to merge with the side walls thereof so that the base of the tray is comparatively stiff, the base of the tray being enlarged to provide a lip and the bottom of the tray being dished to provide a suction cup, said lip adapted to form an effective suction cup despite the rigidity imparted to the body of the tray by the partition and the additional rubber at the bottom of the tray due to the rounding of the bottoms of the compartments, said base being thinnest along the bottom of the compartments so that in the action of the suction cup the base will bend along two lines substantially parallel to the partition.

MELVIN S. LOWER.